United States Patent [19]

Schmidt et al.

[11] Patent Number: 5,058,183
[45] Date of Patent: Oct. 15, 1991

[54] REAL VIDEO TIME SIZE SELECTION MODE

[75] Inventors: Karl-Heinz Schmidt, Aying; Wilhelm Waidelich, München, both of Fed. Rep. of Germany

[73] Assignee: Gesellschaft für Strahlen-und Umweltforschung GmbH, Neuherberg/München, Fed. Rep. of Germany

[21] Appl. No.: 515,349

[22] Filed: Apr. 30, 1990

Related U.S. Application Data

[63] Continuation of Ser. No. 170,246, Mar. 18, 1988, abandoned.

[30] Foreign Application Priority Data

Mar. 18, 1987 [DE] Fed. Rep. of Germany ....... 3708795

[51] Int. Cl.$^5$ .......................... G06K 9/62; G06K 9/00
[52] U.S. Cl. ........................................ 382/30; 382/45; 382/48; 382/6
[58] Field of Search .................... 358/166, 284; 382/6, 382/27, 30, 42, 45, 48, 41

[56] References Cited

U.S. PATENT DOCUMENTS

| | | | |
|---|---|---|---|
| 3,618,016 | 11/1971 | Van Steeals . | |
| 4,404,683 | 9/1983 | Kobayashi | 382/6 |
| 4,499,597 | 2/1985 | Alves | 382/54 |
| 4,510,616 | 4/1985 | Lougheed | 382/27 |
| 4,543,660 | 9/1985 | Maeda | 382/27 |
| 4,623,923 | 11/1986 | Orbach | 382/34 |
| 4,648,119 | 3/1987 | Wingfield | 382/27 |
| 4,658,428 | 4/1987 | Bedros | 382/54 |
| 4,710,965 | 12/1987 | Kobayashi | 382/54 |
| 4,720,871 | 1/1988 | Chambers | 358/166 |
| 4,724,544 | 2/1988 | Matsumoto | 382/27 |
| 4,855,928 | 8/1989 | Yamanaka | 382/34 |

FOREIGN PATENT DOCUMENTS

| | | |
|---|---|---|
| A2209252 | 1/1987 | European Pat. Off. . |
| 1143585 | 2/1969 | United Kingdom . |
| 1590871 | 6/1981 | United Kingdom . |
| 2173026 | 10/1986 | United Kingdom . |

OTHER PUBLICATIONS

Remler: "Pattern Recognition by Convolution Polynonial"-IEEE Trans. on Computers–May 1974–pp. 528-530.

Primary Examiner—Gerard R. Strecker
Assistant Examiner—Jose M. Solis
Attorney, Agent, or Firm—Spencer & Frank

[57] ABSTRACT

A method for real video time size selection for objects represented as video images which are to be filtered out so as to be classified as to their shape, including the steps of: recording the video image with a scanning recording beam; digitalizing the video image; providing at least one selected mask representing a selected object image shape; examining the digitalized image, pixel by pixel, with the selected mask while displacing the selected mask over the video image in synchronism with the recording beam; and, upon the occurrence of a given degree of coincidence between a selected section of the image and the selected mask, indicating detection of the object as such.

3 Claims, 3 Drawing Sheets

REAL VIDEO TIME SIZE SELECTION MODE

This application is a continuation of application Ser. No. 07/170,246 filed 3-18-88, now abandoned.

BACKGROUND OF THE INVENTION

The present invention relates to a real video time size selection method for objects which are represented as television images and are to be filtered out so as to be classified according to shape, particularly for the automatic examination of cytologic preparations.

For automatic examination, it is known to scan a preparation, for example, in a meander pattern by means of a scanning table. Images of suspect cells are sorted out from the image information of a respective image section and the coordinates of these cells are stored for later visual evaluation of the images. Purely optical or electronic filters including computers or other hardware are generally employed for the filtering operations.

In practice, each one of these methods cannot be employed alone to produce an accurate diagnosis in a justifiable amount of time. The image recognition method disclosed in DE-OS [FRG Laid-Open Application] 3,524,505 is likewise complicated and requires additional computations during the line blanking period, with information identifying the positions of the patterns being lost.

SUMMARY OF THE INVENTION

It is an object of the present invention to provide an improved method of the above-mentioned type in which objects belonging to certain shape classifications are filtered out of television images, with their respective shape being programmable and the positions of the patterns remaining available, to permit, in particular, the detection of cancer cells in cytologic preparations.

The above and other objects are achieved, according to the present invention, by a method for real video time size selection for objects represented as video images which are to be filtered out so as to be classified as to their shape, comprising: recording the video image with a scanning recording beam; digitalizing the video image; providing at least one selected mask representing a selected object image shape; examining the digitalized image, pixel by pixel, with the selected mask while displacing the selected mask over the video image in synchronism with the recording beam; and, upon the occurrence of a given degree of coincidence between a selected section of the image and the selected mask, indicating detection of the object as such.

Additional novel features of the invention will be described in detail below.

In the electronic mask filtering method employed according to the present invention, the television image of the preparation is threshold filtered in such a manner that, for example, only the nuclei of the cells are detected. Then the image is digitalized and thereafter compared pixel by pixel with a given mask. On the television monitor, this mask is superimposed on the image field in synchronism with the recording beam and when a given degree of coincidence occurs between the image section and the mask, the object is considered to be detected. The mask selected has the form of a circular area having a radius which approximately corresponds to that of a suspect cell. The advantages of this system lie in its high evaluation speed (real video time) and in its great flexibility. Within the limits of the resolution of the mask, any desired shapes (e.g. letters for automatic character recognition) can be filtered out of the television image. Moreover, the system is insensitive to interference, i.e. images full of noise can also be processed. The positions of the detected alarms are not lost and can be further processed by known methods. The circuit configuration is simple and can be implemented inexpensively.

The mask can be programmed and AND masks can be used as well, i.e. masks which indicate that certain pixels have a certain value and that the pixel configuration of a packet of pixels meet certain criteria for the entire field to be considered. Moreover, a circuit is obtained which first analyzes a pixel field. To be able to also reject spaces between lines, it is possible not only to bring every $j^{th}$ line, but also every line, out of the line shift registers and to feed it to the input of a look-up table. At the output of this table, the information is then available as to whether this pixel field is valid or not. Except for a small constant shift, the alarms have the same screen coordinates as the detected patterns. Thus it is possible to detect several objects simultaneously in one image and the coordinates of the alarm can then be stored in real video time according to known methods.

The invention will be described in greater detail below with reference to an embodiment illustrated in FIGS. 1 to 4.

DESCRIPTION OF THE PREFERRED EMBODIMENTS

Figure 1:
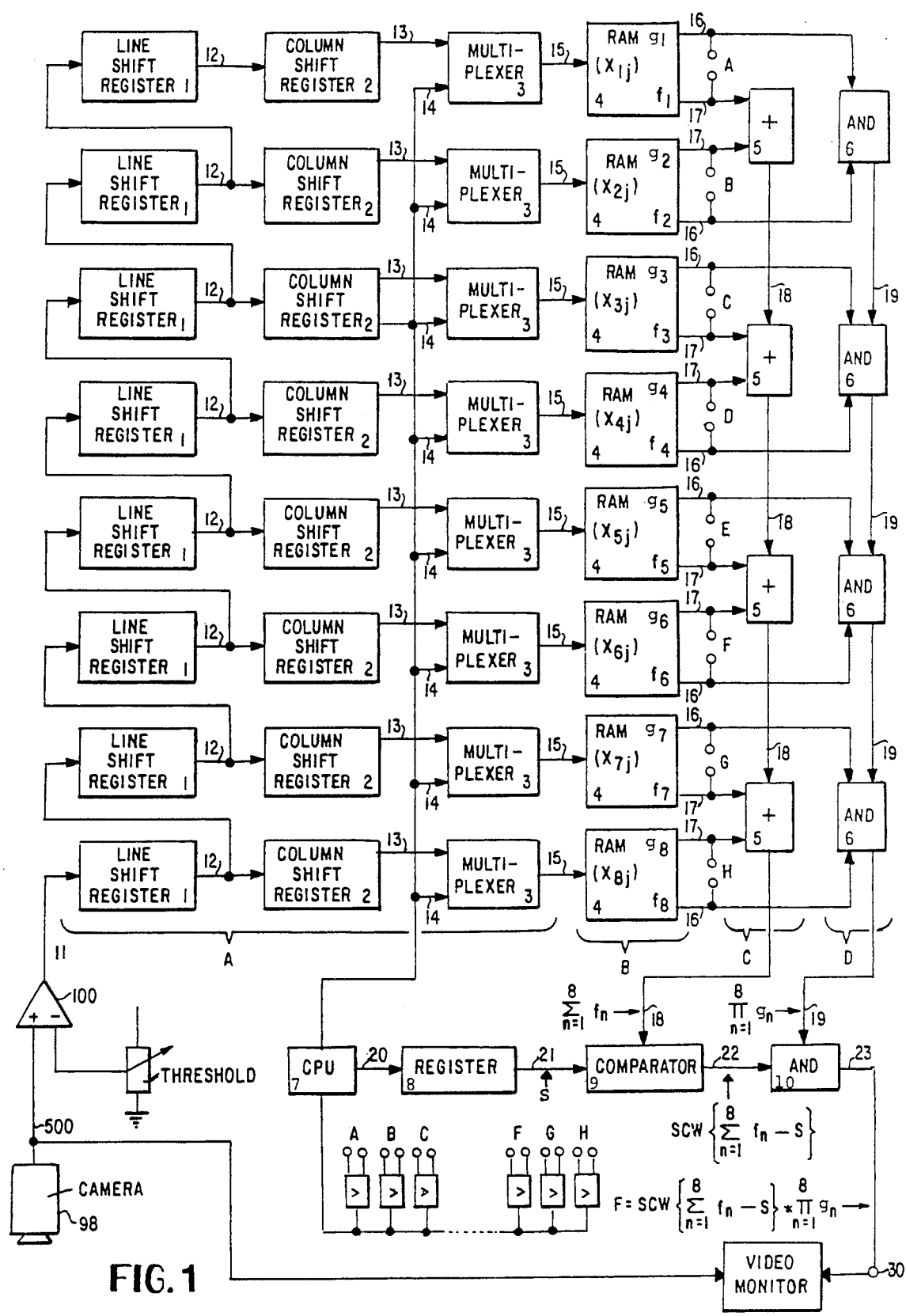
FIG. 1 is a block circuit diagram of an embodiment of an electronic mask filtering system according to the invention.

An electronic mask filtering system according to the invention is composed essentially of a circuit arrangement as shown in FIG. 1, in which serial, threshold filtered video signals on an input line 11 are converted into a pixel field of 8*8 bits appearing on eight busses 13, with each bus 13 being composed of 8 conductors for the corresponding 8 pixel bits so that each pixel is associated with a respective conductor.

The 64 lines of busses 13 pass through multiplexers 3 (74LS 157, and into one for each bus 13, respective comparison elements 4, e.g. each comprising an AM-2149-35 (Read-Write Memory). Each comparison element 4 has a 3-line output 17 providing a 3-bit word that indicates the number of coinciding pixels. The 3-bit words at the corresponding outputs 17 of each pair of adjacent comparison elements 4 are added together in a respective one of four adders 5 (e.g., a 74S83) which are connected together via respective outputs 18 so that the respective addition results are added together in the four adders 5. The combined addition result appears at a 7-line output 18 of the last adder 5 in the chain and is compared in a comparator 9 (e.g., a 74S85) with a threshold value provided by an element or register 8. (745LS5374.

Each comparison element 4 further has a respective 1-line output 16 connected to one input of an associated AND linkage 6, (74LS08) each adjacent pair of comparison elements 4 being connected to a respective linkage 6 and each linkage 6 associated with a pair of elements 4 having a 1-line output 19 connected to an input of the next-succeeding linkage 6. The output 19 of the last linkage 6 in the series is connected to one input of a further AND linkage 10 which has a second input connected to the output 22 of comparator 9.

If the coincidence value produced by comparator 9 lies above the programmed threshold value provided by element 8 and if the AND linkages 6 of comparison modules 4 do not indicate zero at their output, there is produced at a terminal 30 an indication (F) that the object has been detected. This linkage permits detection to be indicated only if certain pixels have a predetermined value.

Read-write memories (RAM's) are here employed as comparison elements 4. The 8 input lines 15 to each RAM 4 are connected to the address inputs thereof and the 1-line and 3-line outputs 16 and 17 serve as RAM outputs. Memories 4 are programmed as look-up tables so that for each pixel configuration there is available at the 3-line output 17 an output value for coincidence with the given mask. The additional 1-line output 16 furnishes the bit for AND masking. The signals on the 1-line and 3-line outputs are AND-linked and then again AND linked with the threshold-discriminated signal from comparator 9. Thus a signal is present at output 30 of the circuit only if the number of coinciding pixels lies above the threshold value provided by element 8 and the value fed to AND linkage 10 via the output 19 of the AND linkages 6 is not zero.

Video input 11 is fed into line shift registers 1 so that their outputs provide the respective preceding lines of the television image. Each column shift register 2 converts the associated serial line into 8 parallel pixels which are then fed as input values via busses 13 and multiplexers 3 to comparison elements 4.

A computer 7 is able to program comparison modules 4 via multiplexers 3 and a plurality of driver modules 29 (74LS244), each of which is connected with the outputs 16 and 17 of a respective comparison element 4.

Figure 2:
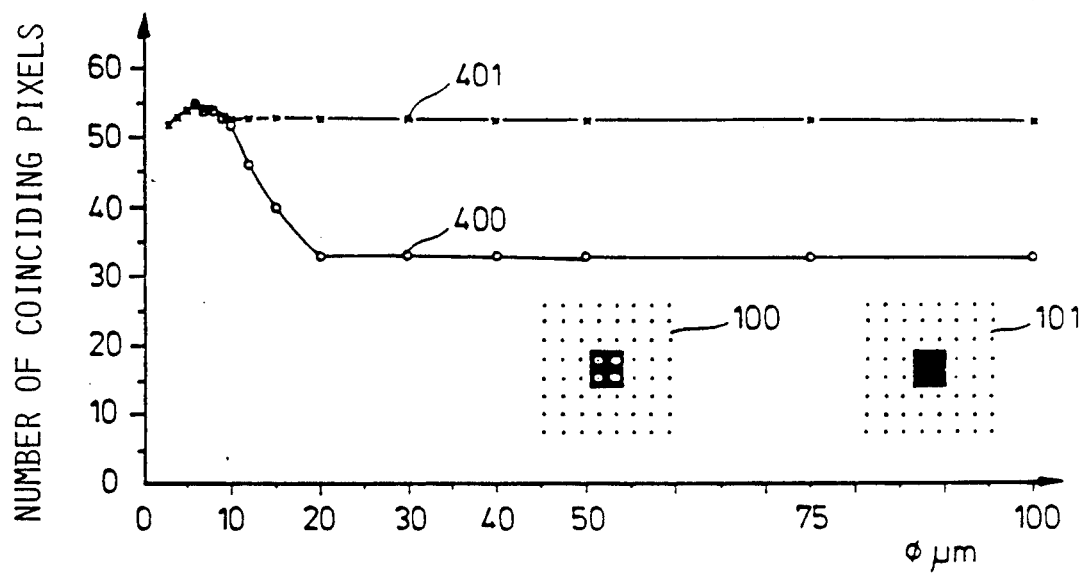
FIGS. 2–4 are diagrams illustrating various masks used in the practice of the invention and corresponding filter curves.
Figure 3:
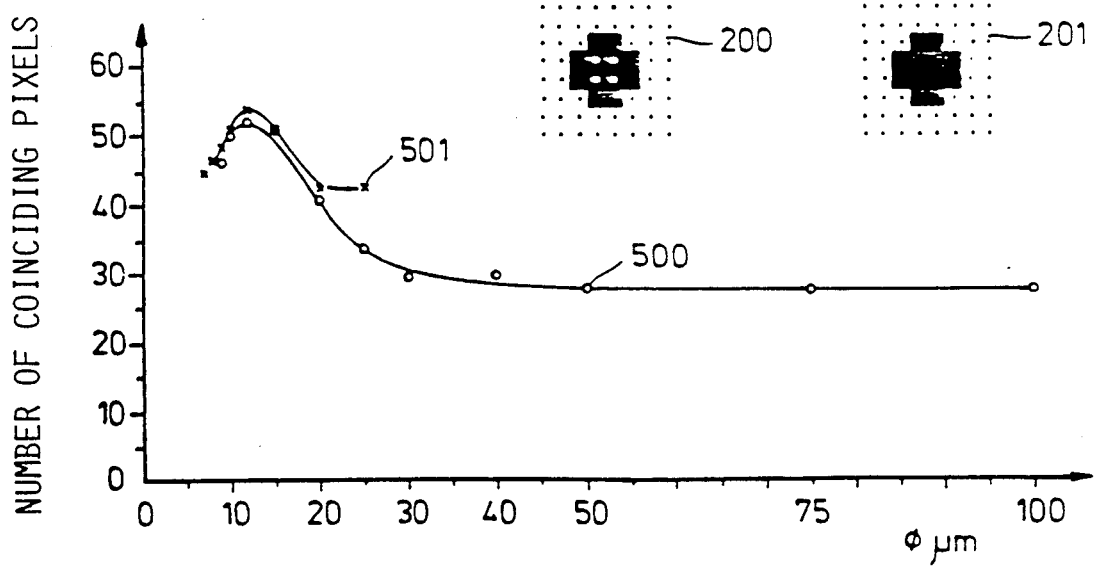
Figure 4:
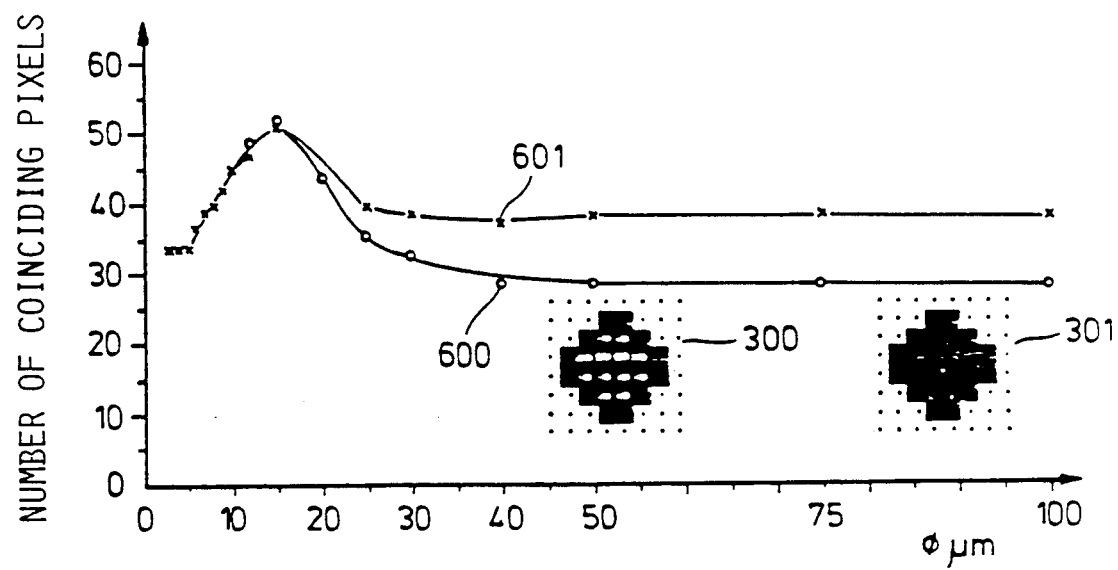

The selection behavior of the electronic mask filtering system will now be described with reference to several filter masks. Three different filter masks were examined, once with and once without AND linkage. FIGS. 2 to 4 show filter masks 100, 101; 200, 201; and 300, 301, respectively. In each mask, a dot indicates a pixel whose value is zero, a black square indicates a pixel whose value is one, and a black square with a white circle in the middle represents a pixel whose value must be one, otherwise the output signal 30 of the filter module of FIG. 1 is zero. The object used was a measuring preparation onto which black circular areas having different diameters were vapor deposited. These objects were now recorded through the microscope by means of a video camera 98 (FIG. 1), and; the resulting video signal, after being threshold discriminated by means of a comparator 100 (LM710) was fed via input line 11 to the electronic mask filtering system. The value 3 provided by threshold element 8 on line 21 was always selected high enough that the object could just yet be detected. The thus found threshold is plotted in FIGS. 2-4 as a function of object diameter, in $\mu$. Filter curves 400, 401 correspond to masks 100, 101, respectively, and so on. All filter curves 400 to 601 exhibit a more or less distinct maximum of the threshold value. If the threshold value is placed somewhat below this maximum, only those objects are detected whose filter value lies above this threshold value, provided by element 7.

Regarding the individual filter curves 400 to 601;

FIG. 2 shows a mask 101 in which only four pixels are to have the value of one. The associated thresholds 401 indicate, for filtering without AND linkage, only a very weakly defined maximum. With AND linkage according to FIG. 2 and with mask 100 and threshold 400, the output value for a circular area of less than $5\mu$ is zero since for areas having diameters of less than $5\mu$, all four pixels can never simultaneously have a value of one. With diameters over $5\mu$, this condition is met and the output signal rises to 55 coinciding pixels. A value of 64 coinciding pixels is difficult to attain since, due to its relatively poor resolution, the filter mask is still quite far removed from an ideal circle. With larger diameters, the output signal then drops again to 32.

FIG. 3 shows the filter mask 200 employed for cell detection. Its maximum lies at about $12\mu$. With the corresponding threshold 500, it is then possible to filter out nuclei having a diameter between 10 and $15\mu$. Only the four innermost pixels are here set as AND pixels so that deformed or possibly irregularly colored nuclei can also be detected. Here again, the AND linkage shows a noticeable improvement in selection behavior.

For mask 201 without AND linkage, even circular areas having a diameter larger than 25 $\mu$m can no longer be detected, as can be seen from threshold curve 501.

FIG. 4 once more shows enlarged filter masks 300 and 301, respectively. Here again one can see that the AND linkage leads to a considerable improvement in the selection, as can be seen from a comparison of threshold curves 600 and 601.

Thus, the basic principle is here that the television image is digitalized and is then compared pixel by pixel with a given mask 100 to 301.

This mask is drawn over the television image on the monitor in synchronism with the recording beam and, at a given degree of coincidence between the image section and the mask, the object is considered to be detected.

The comparison elements employed are RAM's 4 (read-write memories) which are programmed as look-up tables. Because of the limited number of address inputs, it is generally not possible to process all of the pixels, instead only a certain number of pixels are processed in memory 4 and then the results of the comparisons are combined (9-10).

A comparison is made each time of k packets of 1 pixels, where K×1 is the total number of pixels to be compared. The thus obtained deviation of the actual value from the desired value is then assigned the value on line 17 in RAM 4 for each pixel packet. These numbers on line 17 are added up in adders 5 and the sum is compared in comparator 9 with the threshold value 5 provided by element 8 on line 21. If the resulting number lies above the threshold values, the object is detected.

A further criterion is the validity of the pixel packets. Pixel packets are considered to be valid if the actual value meets certain conditions; for example, certain pixels must have a given value. The entire image field is valid only if all pixel packets are valid. An object can thus be considered detected only if all lines are valid and the degree of coincidence lies above the threshold provided by element 8.

At a certain point in time, all pixels which are to be compared with the desired value must simultaneously be present in RAM's 4. The lines are intermediately stored in line shift registers 1. The individual pixels of each line are read into column shift registers 2 and are put out in parallel on line 13. Thus, column shift registers 2 connected to the parallel outputs 12 of line shift registers 1 are able to receive all pixel values to be processed.

The thus obtained pixel values must now be compared with the desired values in comparison circuits 4. The comparison must not take longer than one pixel clock period since with the next clock pulse a new pixel value pattern must be compared with the desired value. The outputs of the respective comparison elements 4 then furnish an n-bit binary value for coincidence on lines 17 and possibly also a bit on lines 16 for the validity of the lines. The coincidence values are then added in adders 5 and are thereafter compared with the threshold value from element 8 in binary comparator 9. If the value is higher than the threshold, the output bit of comparator 9 on lines 22 is set to equal 1. Validity bits "1" on line 16 are AND-linked in linkages 6, and then again AND-linked with the output bit on line 22 in linkage 10. If all lines are valid and the coincidence value lies above the threshold value on line 21 from element 8, the object is considered detected. The positions of the objects remain available, i.e. except for a slight shift, and the alarms appear at the same location in the television image as the pattern to be tested.

1.0 Theory of Electric Matrix Filtration (FIG. 1)

This section contains first a very general description of the mathematical picture of the electronic system. In order to use the system for size selection, the f mentioned below must be programmed in such a way that the function values $f_n$, represent the numerical value of the pixels in agreement with a mask in a line, n. In this way it is possible to program any $f_n$, e.g., for the detection of horizontal or vertical lines in the TV-image.

Under section 1.2, the $f_n$ are described which allow a size selection to be made.

1.1 General Characteristics of the Electronic System

The system described above (FIG. 1) can be explained as follows:

For each pixel, $\bar{x}_{a,b}$, local matrix filtration, F, is carried out. In the description below, the image element to be investigated is assumed to be stationary.

The image elements pertaining to pixel, $\bar{x}_{a,b}$, are arranged in an 8*8 matrix as follows:

| j = | 1 | 2 | 3 | 4 | 5 | 6 | 7 | 8 | |
|---|---|---|---|---|---|---|---|---|---|
| | $x_{11}$ | $x_{12}$ | $x_{13}$ | . | . | . | | $x_{18}$ | n = 1 |
| | $x_{21}$ | | | | | | | | n = 2 |
| | | | | | | | | | n = 3 |
| | | | | | | | | | n = 4 |
| | | | | | | | | | n = 5 |
| | | | | | | | | | n = 6 |
| | | | | | | | | | n = 7 |
| | $x_{21}$ | | | | | | | $x_{18}$ | n = 8 |

For simplification, we also assume that $$x_{n,j} = x_{(a+n),(b+j)}$$
$$a \in [0, 256] \quad N$$
$$b \in [0, 128] \quad N$$

The filter function, F, has the following form derived from the electronic system (of FIG. 1):

$$F = SCW\left(\left(\sum_{n=1}^{8} f_n(x_{n1}, x_{n2}, \ldots, x_{n8})\right) - S\right) \cdot \prod_{n=1}^{8} g(x_{n1}, x_{n2}, \ldots x_{n8}) \quad (1)$$

$$f \in [0, 7] \, N \quad x, g \in [0, 1] \, N \quad S \in [0, 63]$$

The function, SCW (y), has the following values:

$$SCW(y) = \begin{cases} 0 \text{ for } y \leq 0 \\ 1 \text{ for } y > 0. \end{cases}$$

For the functions, $f_n$ and $g_n$, (which appear on the respective output lines 17 and 16); all functions within the corresponding range of values are permitted. The function values, $f_n$, are added up by the electronic circuit (adders 5) and compared with the threshold value, S (in comparator a).

If $$\sum_{n=1}^{8} f_n > S$$

and all $g_n = 1$ (i.e., a "1" is supplied to AND-linkage 10 via line 19), then F=1, otherwise F=0.

For example, the localizations of all horizontal lines with a minimum length of eight pixels in a TV image will be shown $$f_4 = \sum_{j=1}^{8} x_{4j} \quad g = 1$$

$$F = SCW\left(\sum_{j=1}^{8} x_{4j} - S\right)$$

1.2 Filter Function Used

The functions, f, have been chosen in such a way that f indicates the number of pixels in agreement per reference element. The following equation holds for a pixel:

$$p_{nj} = \overline{x_{nj} \quad m_{nj}} \quad vo_{nj} \text{ table for } \begin{array}{|c|c|} \hline & 0 & 1 \\ \hline 0 & 0 & 1 \\ 1 & 1 & 0 \\ \hline \end{array}$$

The function values permitted for $x_{nj}$, $o_{nj}$, and $m_{nj}$ are the values 0 and 1. $x_{nj}$ is the image element, $m_{nj}$ the corresponding pixel of the reference mask, $o_{nj}$ is the bit determining the validity of the image elements. If one sets $o_{nj}=1$, than $x_{nj}$ can assume any value without affecting $p_{nj}$. It is easily ascertained that $p_{nj}=1$, if $x_{nj}=m_{nj}$ and $p_{nj}=0$, if $x_{nj} \neq m_{nj}$.

Then all pixels in agreement are added up:

$$f_n = \left(\sum_{j=1}^{8} p_{nj}\right) - 1 \text{ for } f_n = -1 \text{ one sets } f_n = 0.$$

For the function, g, an AND conjunction p, was chosen with a:

$$g_n = \pi_{js1}^{8} p_{nj}\widetilde{a}_{nj}$$

$a_{nj}$ is the mask chosen which indicates whether a conjunction is to be made, i.e., whether the pixel, $x_{nj}$, must agree with the mask, $m_{nj}$, in order for F not to become zero. $a_{nj}=0$ means mask of $a_{nj}=1$; an AND conjunction is made.

If one substitutes into Eq. (1), the result is $$F = SCH\left[\sum_{Ks1}^{64} p_k - S\right] \cdot \pi_{ks1}^{64} (P_k\widetilde{va}_k) \text{ if all } f_n > 0.$$

The invention now being fully described, it will be apparent to one of ordinary skill in the art that many changes and modifications can be made thereto without departing from the spirit or scope of the invention as set forth herein.

We claim:

1. A method for real video time size selection for objects represented as video images which are to be filtered out so as to be classified as to their shape, comprising:

recording the video image with a scanning recording beam;

digitalizing the video image;

providing at least one selected mask representing a selected object image shape;

during each pixel clock period of the video image, comparing a k×L pixel section of the digitalized image, pixel for pixel, with the selected mask, using comparison elements in the form of random access memories programmed as look-up tables, while displacing the selected mask over the video image in synchronism with the recording beam, with said step of comparing including separately comparing k packets of L pixels at a time with the respective pixel values of the mask, with the product of k×L being the total number of pixels to be compared during each pixel clock period, assigning a desired comparison value to each pixel packet, determining the deviation of the actual comparison value from the desired comparison value for each pixel packet and providing a respective deviation value corresponding to each deviation, adding the resulting deviation values for the k packets, comparing the addition result with a threshold value, and checking each pixel packet for validity; and, indicating detection of the object on the recorded video image when, during said step of comparing a k×L pixel section, all of said k pixel packets which are being compared at the same time are determined to be valid and said threshold value is exceeded.

2. A method as defined in claim 1 wherein said step of indicating comprises producing a dot on the recorded video image corresponding to a detected object.

3. A method as defined in claim 1 wherein said video image is an image of a cystologic preparation.

* * * * *